United States Patent [19]
Kendall et al.

[11] 3,823,903
[45] July 16, 1974

[54] DUAL LENGTH PENDULUM SHOCK ABSORBING SYSTEM

[75] Inventors: Giles A. Kendall, Des Moines, Wash.; James C. Hoppe, Burbank; Wilbur P. Hsieh, La Canada, both of Calif.

[73] Assignee: Menasco Manufacturing Company, Burbank, Calif.

[22] Filed: Mar. 3, 1972

[21] Appl. No.: 231,633

[52] U.S. Cl.............. 248/18, 89/1.8, 248/358 R
[51] Int. Cl.................. G01n 29/00, F41f 3/04
[58] Field of Search............ 248/15, 18, 17, 358 R, 248/324, 317, 327; 188/64, 1 B; 89/1.81, 1.8

[56] References Cited
UNITED STATES PATENTS

| | | |
|---|---|---|
| 1,732,942 | 10/1929 | Martinson et al................. 188/64 |
| 2,558,164 | 6/1951 | Yeasting............................. 248/17 |
| 2,580,815 | 1/1952 | Mooney et al..................... 248/18 |
| 3,180,222 | 4/1965 | Moy................................... 89/1.81 |
| 3,358,958 | 12/1967 | Russa............................ 248/358 R |
| 3,421,363 | 1/1969 | Herr................................. 89/1.8 X |
| 3,523,483 | 8/1970 | Serbin................................. 89/1.8 |

*Primary Examiner*—J. Franklin Foss
*Attorney, Agent, or Firm*—Robert E. Geauque

[57] ABSTRACT

A shock absorbing system employing a long pendulum and a short pendulum, the long pendulum to isolate against small motions, the short pendulum to isolate against large motions. A spring-damper assembly is connected to the long pendulum to damp the horizontal motion of the long pendulum.

10 Claims, 5 Drawing Figures

3,823,903

DUAL LENGTH PENDULUM SHOCK ABSORBING SYSTEM

BACKGROUND OF THE INVENTION

The field of this invention relates to load supporting systems and more particularly to a system to protect a load against damage due to movement of the system caused by externally applied shock forces.

The system of this invention has particular utility in the absorbing of small motions to protect a missile against damage while it is stored within an underground silo. However, it is to be understood that the system of this invention can be readily employed upon any load supporting system where it is desired to protect the load against damage by small motions and also to minimize the effects of damage by large motions. Regarding the supporting of a missile, there are two types of ground shocks which can be anticipated: (1) Seismic disturbances which can be classified as small motions, and (2) Large motions such as caused by a nuclear explosion adjacent the missile site.

Due to its great height, a missile in an upright position is quite vulnerable to roll forces which would produce a tipping action on the missile platform. Even a minor tipping at the base of the missile produces a major tipping at the top of the missile, which may be fifty feet or more above the base of the missile. This can result in a missile tipping over within the silo such that it rests against the silo wall. The outer skin of the missile is very thin so that the missile is quite susceptible to damage. Thus the tipping over of a missile within its concrete silo can damage it so that it can be completely unsuitable for further service.

A known form of missile supporting system is shown and described within U.S. Pat. No. 3,516,628, issued June 23, 1970, and assigned to the assignee of the present invention. Within the foregoing patented missile supporting system, the missile is supported with respect to the silo wall by a plurality of spaced apart cable assemblies. Each of the cable assemblies functions basically as a pendulum. For a small motion, such as a seismic disturbance, it is desirable that the pendulum system act as an elongated pendulum. It has been found that an elongated pendulum minimizes the effect of the small motions on the guidance and control systems of the missile.

During conditions of large horizontal ground motion, a long pendulum system supplies only a small horizontal force to the missile. Because of this small force the missile tends to remain fixed in the earth's reference frame. Thus, during a condition when the ground and silo move toward the missile the missile moves very little in a direction to avoid striking the silo wall. Because of the poor response of the missile pendulum support system to the ground motion excessive space (rattle space) must be allowed between the missile skin and silo wall, thus increasing the required size of the silo with its resultant cost increase. A short pendulum suspension system by contrast causes the missile to respond more efficiently with the ground motion and thus requires a minimum of rattle space and thus a lower silo cost.

SUMMARY OF THE INVENTION

The system of this invention relates to a pendulum apparatus which functions as a long pendulum for small motions and as a short pendulum for large motions. Basically, the pendulum is divided into an upper pendulum link and a lower pendulum link. The upper pendulum link is connected to a bracket which is fixed with respect to the silo wall. The lower pendulum link is fixed to a portion of the missile supporting apparatus. The upper pendulum link is pivotally connected to the lower pendulum link. A bracket is fixed to the silo wall and surrounds the pendulum in the area of the connection of the upper pendulum link to the lower pendulum link. The bracket permits a certain amount of free play movement of the pendulum with respect thereto. The amount of free play movement is determined by the desired maximum horizontal excursion of this point caused by the small motion. As a result, both the upper pendulum link and the lower pendulum link combine to form a long pendulum upon incurring a small motion. Upon incurring a large motion, the connection between the upper pendulum link and the lower pendulum link comes into contact with the bracket after the free play movement is used, which thereby causes only the lower pendulum link to be effective for further ground motion.

A damping assembly is connected to the guide rod of the missile supporting apparatus. The connection of the damping assembly is directly adjacent the connection of the guide rod to the lower pendulum link. The damping assembly is designed to be effective to damp small motions but be ineffective during large motions. Each damper of the damper system is designed to frictionally damp the motion upon movement of the guide rod away from the silo wall. The damper is placed inoperative during movement of the guide rod toward the silo wall.

DETAILED DESCRIPTION OF THE SHOWN EMBODIMENT

Figure 1:
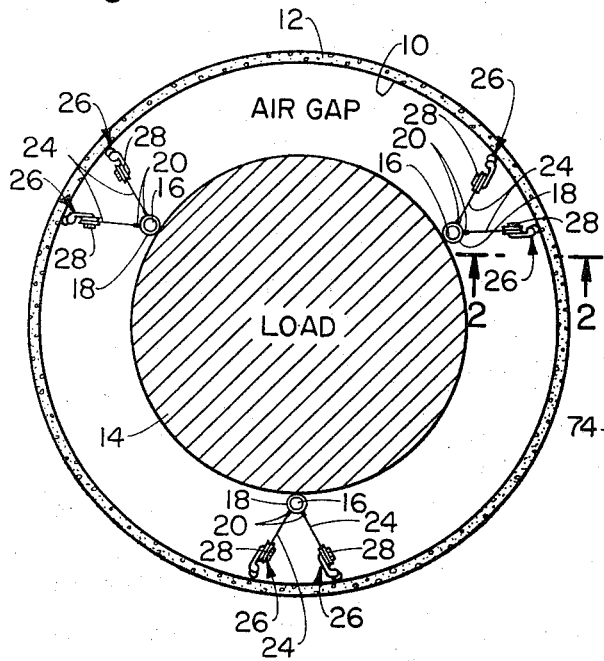
FIG. 1 is an overall plan view of the system of this invention as it would be employed to support a circular load within a cylindrical solid structure such as a missile silo.
Figure 3:
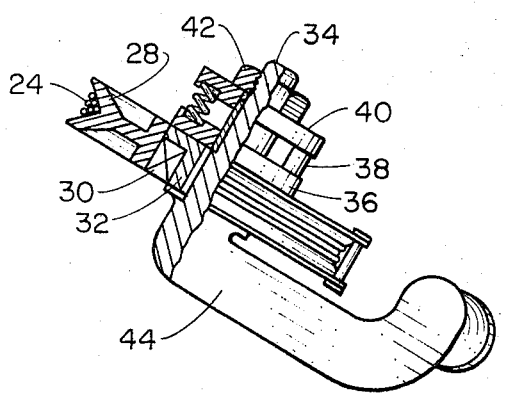
FIG. 3 is a partly in cross-sectional view of a portion of the damping structure taken along line 3—3 of FIG. 2.

Referring particularly to the drawings, there is shown in FIG. 1 an opening 10 which is located within a fixed object 12. A load 14 is to be suspendedly supported within the opening 10. As an example of such a type of structure, the opening 10 could comprise a silo which is located within the ground 12 with the load 14 comprising a missile. Although it is envisioned that the apparatus of this invention is to be employed with the opening 10 being circular and with basically the load structure 14 being also circular and concentrically located within the opening 10, it is to be considered within the scope of this invention to employ other configurations of openings and other configurations of loads. For example, with minor modifications it is believed that the structure of this invention could be employed upon a rectangular load which is located within a rectangular opening. Actually, the structure of this invention could be employed in any instance in which a load is suspendedly supported with respect to a fixed object.

Connected to the load 14 are a plurality of guide rods 16. The guide rods 16 are to be fixed and prohibited against lateral movement with respect to the load 14. It is to be noted that the guide rods 16 are equiangularly spaced about the load 14 with three in number of such guide rods being employed. Although this three-point, 120° apart spacing has been found to be most desirable, it is considerably within the scope of this invention to employ other guide rod spacing.

Surrounding each guide rod 16 is a collar 18. Each of the collars 18 is loosely supported upon its respective guide rod 16. Integrally formed upon each collar 18 are a pair of spaced apart attaching brackets 20. Each of the attaching brackets 20 are to be fixedly connected by means of a bolt 22 to a line element 24. As shown within FIG. 1, there are two such line elements 24 connected to each collar 18. The angle between each pair of line elements 24 comprises an acute angle of approximately 60°.

Connected to each line element is a damper 26. A pair of dampers 26 are connected to a single collar 18 and are to comprise a damping unit. There are three such damping units within the damping assembly.

Each of the dampers 26 are to function to damp only the small motions which are caused by small forces tending to move the load 14 with respect to the fixed object 12. In the environment of a missile within a silo, such small motions are caused normally by seismic disturbances. It is desired that the damper 26 be relatively ineffective during application of a large motion such as an adjacent nuclear explosion in the case of a missile.

Each damper 26 is designed to only damp movement of the load 14 as it effects extension of the line element 24. The line element 24 can take the form of either a wire, cable, rope, or the like. During movement of the load 14 toward the damper 26, no damping of that movement occurs with respect to that particular damper. However, the movement is being damped by other dampers 26 within the damping assembly.

The damper 26 includes the use of a pulley 28 upon which the line element 24 is to be wound several times. This winding of the line element 24 about the pulley 28 is to effect a desirable frictional connection between the line element 24 and the pulley 28. The pulley 28 is connected through a unidirectional clutch 30 to a sleeve 32. The clutch 30 is to be engaged upon extending movement of the line element 24 and be disengaged upon the winding up movement of the line element 24. Sleeve 32 includes a central opening through which passes a shaft 34. The sleeve 32 is adapted for rotational movement with respect to the shaft 34. A frictional brake assembly is to be secured to the shaft 34 which includes the use of a brake shoe 36, a spring 38 and a back plate 40. Back plate 40 is fixedly positioned upon the shaft 34 adjacent nut 42. Spring 38 functions to exert a constant bias forcing the brake shoe 36 into frictional engagement with the sleeve 32. As a result, during the rotational movement of the pulley 28 which results in the extending of the line element 24, the frictional contact of the brake shoe 36 with the sleeve 32 exerts a frictional force tending to resist the rotational movement of the pulley 28.

The free end of the shaft 34 is integrally connected to an arm 44. Arm 44 cooperates through a bearing assembly with a sleeve 46. Sleeve 46 is fixedly secured to the fixed object 12. As a result, the pulley 28 is capable of pivotal movement with respect to the sleeve 46 which permits the line element 24 to align itself properly during movement of the load 14.

The free end of the line element 24 is secured to an elongated spring 48. The free end of the elongated spring 48 is secured to a bracket 50 which is secured to the fixed object 12. The purpose of the spring 40 is to maintain tension in the line element 24 at all times so that the line element 24 will not become slack when the load 14 moves toward the pulley 28. The spring 48 is preloaded such that it can accommodate plus or minus 18 inches of deflection.

Each of the guide rods 16 are pivotally connected to a lower pendulum link 52. The free end of the lower pendulum link 52 is pivotally connected to an upper pendulum link 54. The free end of the upper pendulum link 54 is pivotally connected to the bifurcated end 56 of a bolt 58. The bolt 58 is threadably secured through discs 60 and 62. Each of the discs 60 and 62 are fixedly mounted by means of a threaded fastener 64 to a hanger bracket 66. The hanger bracket 66 is fixedly positioned upon the fixed object 12. It is to be understood that there are three such hanger brackets 66 located about the load 14.

Threadably secured upon the bolt 58 on each side of each disc 60 and 62 is a lock nut 68 and 70, respectively. By movement of the bolt 58 with respect to the discs 60 and 62, it facilitates the vertical location as well as the inclined position of the load 14 with respect to the fixed object 12. Once the desired position of the load 14 has been established, the lock nuts 68 and 70 are tightened so as to prevent undesirable movement of each of the bolts 58 with respect to each respective hanger bracket 66.

A limiting bracket 72 is also secured to the fixed object 12 and includes an elongated opening 74 therethrough adjacent its free end. Opening 74 is to be located about the interconnection between the lower pendulum link 52 and the upper pendulum link 54. The size of the opening 74 is predetermined so as to give a limited amount of movement of the interconnection with respect to the bracket 72.

Figure 2:
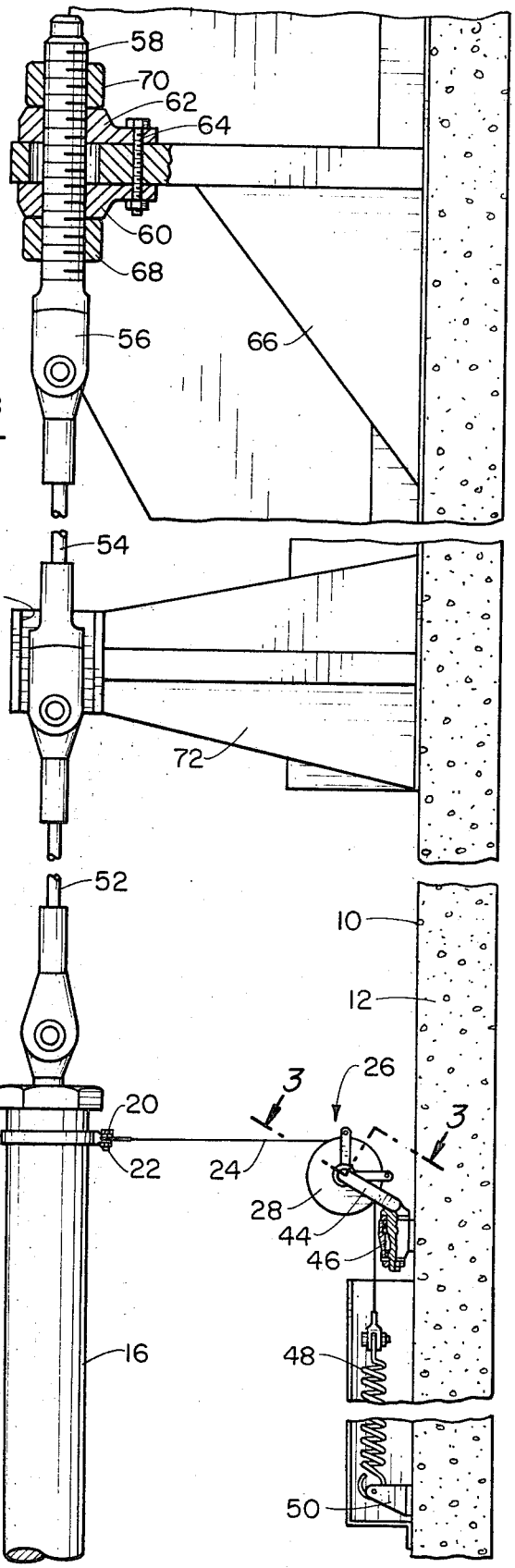
FIG. 2 is a partly in sectional view of a single dual pendulum arrangement and a single associated damper connected therewith taken along line 2—2 of FIG. 1.

The operation of the shock absorbing system of this invention is as follows: It will be assumed that the structure of this invention is in the position of FIG. 2 of the drawings. In this position the load 14 is not being moved by either a small motion or a large motion with respect to the fixed object 12. In other words, load 14 is fixedly positioned with respect to the fixed object 12.

If the fixed object 12 takes the form of ground, and the ground incurs a seismic disturbance, what actually occurs is that the ground moves with respect to the load 14. As a result, the pendulum assembly assumes the position shown in FIG. 4 of the drawings. The movement has caused the connection between the upper link 54 and the lower link 72 to be located adjacent one side of the opening 74, thereby preventing further pendulum type of movement of the upper link 54. The size of the opening 74 is selected so with the interconnection being in the position shown in FIG. 4, the maximum contemplated small motion has occurred. With small motions, the length of the pendulum includes both the links of the upper link 54 and the lower link 54. Because the length of the pendulum includes both the length of the upper link and the lower link, the movement effect is minimized with respect to the guidance and control apparatus which is employed in the firing of the missile.

Because such small motions are known to reoccur frequently, and may establish a certain sequential pattern which causes the motion to be magnified, it is desirable to damp the movement of such small motions. This damping is to be effected by means of the dampers 26.

Figure 4:
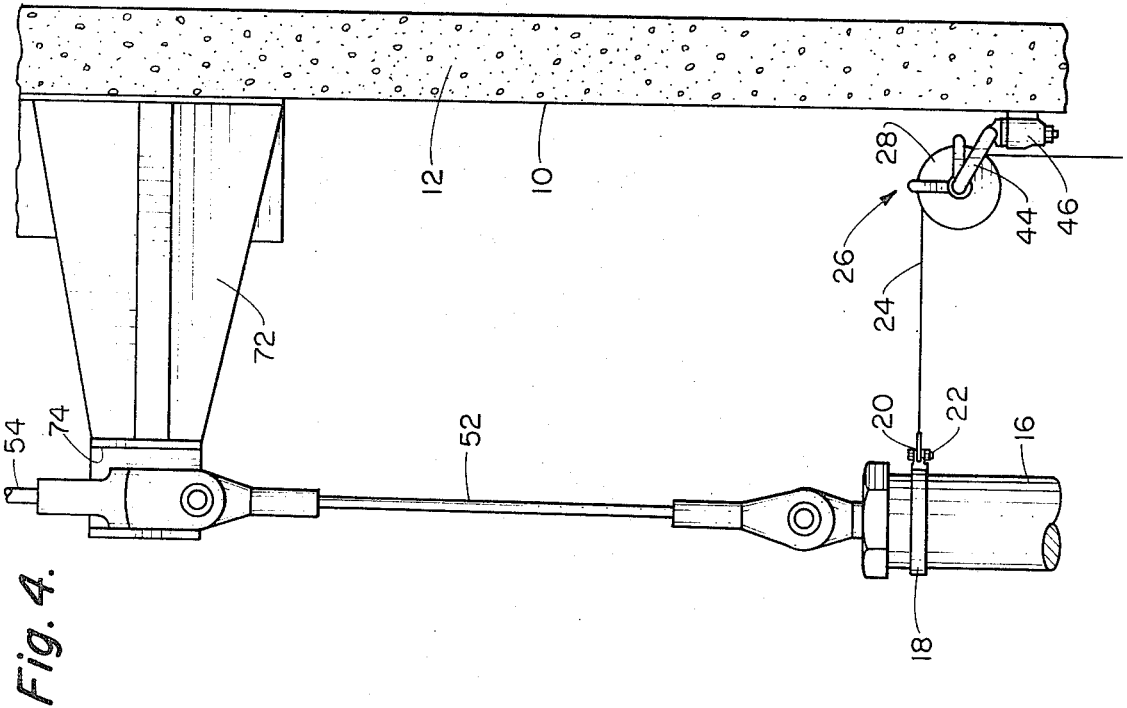
FIG. 4 is a fragmentary view similar to FIG. 2 but showing the system of this invention effected by a small motion.

As the guide rod 16 tends to move away from the pulley 28, the line element 24 is extended and the pulley 28 is unwound in a counterclockwise direction as shown in FIG. 4 of the drawings. The line element 24 is under a constant tension force tending to resist the movement by means of the tension spring 48. Also, as the pulley 28 is rotated in the counterclockwise direction, the unidirectional clutch 30 is engaged which requires the pulley 30 to overcome the frictional force provided by the brake shoe 36 in order to be rotated. As a result, a damping force is provided by the additively combined damping forces of the brake shoe 36 and the tension force of the spring 48.

Upon the small motion being damped, the guide rods 16 will move toward the pulley 28 and the pulley 28 will tend to rotate in a clockwise direction. Rotation of the pulley 28 clockwise disengages the clutch 30 which permits low friction, unhindered movement of the pulley 28 about the shaft 34. The spring 48 maintains the line element 24 taut. In this manner, through the combination of the six in number of such dampers 26 within the damping assembly, adequate damping of the small motion forces will occur.

Figure 5:
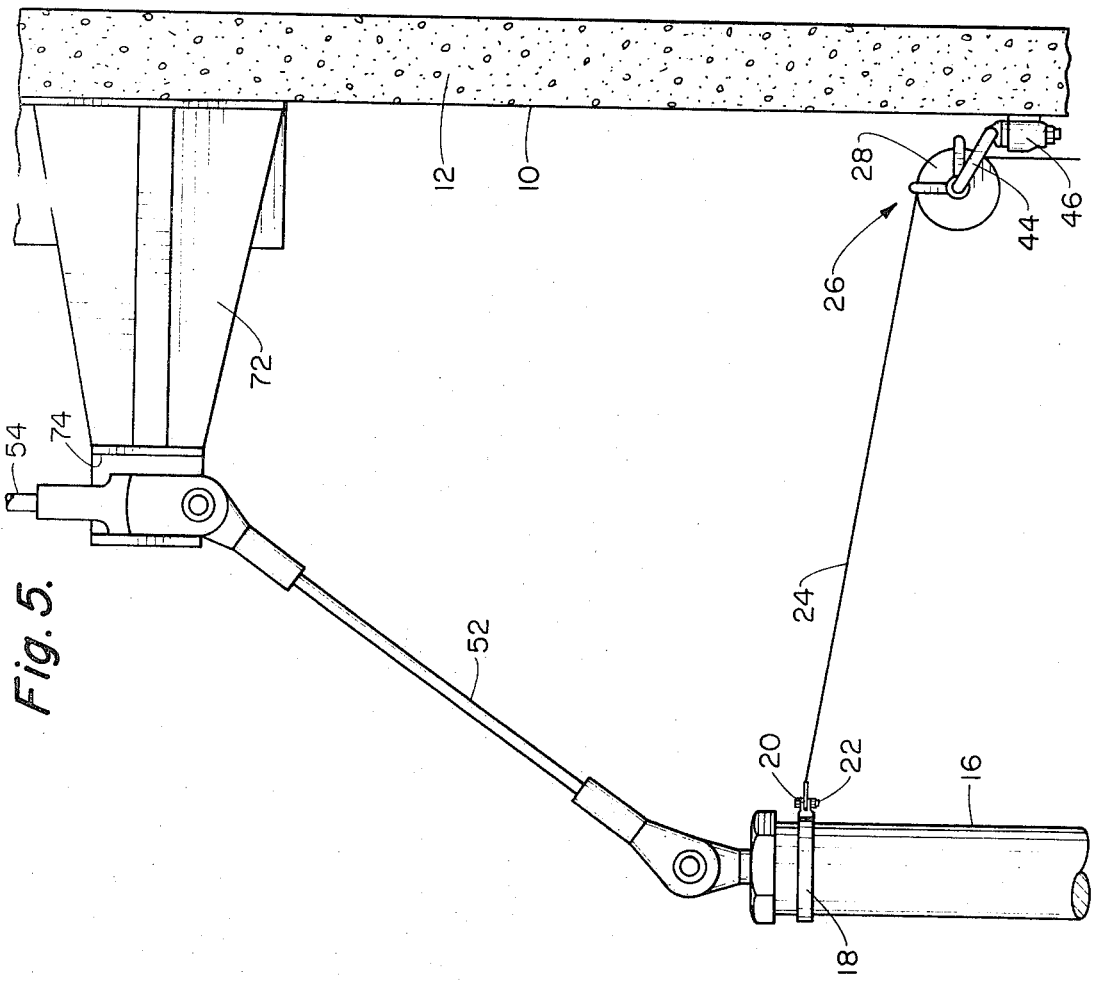
FIG. 5 is a view similar to FIG. 4 but showing the system of this invention effected by a large motion.

Upon the system of this invention incurring a large motion, the system of this invention first goes through the position of FIG. 4 and then takes the position somewhat similar to that shown in FIG. 5 of the drawings. Because the connection between the upper link 54 and the lower link 52 has come into contact with the bracket 72, the pendulum length is provided only by the lower pendulum link 52. Because of the short pendulum length, the amount of movement of the load 14 with respect to the fixed object 12 is minimized. In other words, if the elongated pendulum, which comprises the upper link 54 and the lower link 52, was employed in this instance, it is clearly apparent within FIG. 5 of the drawings that the guide rods 16 would be located at a substantially greater distance from the fixed object 12. It is desired to minimize this movement so as to prevent a portion of the load 14 from coming into contact with the fixed object 12. If the elongated pendulum length was employed, the likelihood of the load 14 coming into contact with the fixed object 12 would be greatly increased.

In the instance of FIG. 5 of the drawings, it is readily apparent the line element 24 of the damper 26 is greatly extended. This extension is being damped by the combined forces of the spring 48 and the frictional brake shoe 36. However, compared to the magnitude of the large motion, this damping force has neglible effect towards resisting of the large motion. Actually, the combined damping effects of the other dampers 26 is neglible to the force of the large motion. This ineffectiveness of the damping force of the dampers 26 in the instance of a large motion is desirable.

What is claimed as new in support of Letters Patent is:

1. A shock absorbing system including:
   a pendulum unit comprising a first pendulum link and a second pendulum link, said first link connected between a fixed object and said second link, said first link being pivotally connected to said second link the longitudinal axis of said first link being substantially in alignment with the longitudinal axis of said second link when in the at rest position, the free end of said second link connected to a load supporting mechanism, said load supporting mechanism to suspendedly support a load relative to said fixed object; and
   a bracket secured to said fixed object, a portion of said bracket to surround said pivotal interconnection of said first link and said second link, said interconnection being movable a limited amount with respect to said bracket.

2. A system as defined in claim 1 wherein:
   said fixed object surrounds said load, there being three in number of pendulum units equiangularly spaced apart about said load.

3. A shock absorbing system including:
   a pendulum unit comprising a first pendulum link and a second pendulum link, said first link connected between a fixed object and said second link, the free end of said second link connected to a load supporting mechanism, said load supporting mechanism to suspendedly support a load relative to said fixed object;
   a bracket secured to said fixed object, a portion of said bracket to surround the interconnection of said first link and said second link, said interconnection being movable a limited amount with respect to said bracket;
   said fixed object surrounds said load, there being three in number of pendulum units equiangularly spaced apart about said load; and
   a damping unit located at each pendulum unit, each of said damping units connected to operate between said load and said fixed object through a line element.

4. A system as defined in claim 3 wherein:
   each of said damping units includes a first damper and a second damper.

5. A system as defined in claim 4 wherein:
   the connection of said damping units with respect to said load being located on a circle, said circle being concentric with said fixed object, each pair of a said first damper and a said second damper being azimuthally located with respect to the radius of said circle to its respective damping unit connection.

6. A shock absorbing system including:
   a pendulum unit comprising a first pendulum link and a second pendulum link, said first link connected between a fixed object and said second link, the free end of said second link connected to a load supporting mechanism, said load supporting mechanism to suspendedly support a load relative to said fixed object;

a bracket secured to said fixed object, a portion of said bracket to surround the interconnection of said first link and said second link, said interconnection being movable a limited amount with respect to said bracket; and
a damping unit located at each pendulum unit, each of said damping units connected to operate between said load and said fixed object through a line element.

7. A system as defined in claim 6 wherein:
each of said damping units includes at least a first damper, said first damper includes a frictional damping means.

8. A system as defined in claim 6 wherein:
said first damper further includes a unidirectional clutching means, said unidirectional clutching means effecting engagement of said frictional damping means only during movement tending to further separate said load and said fixed object in the area of said first damper.

9. A system as defined in claim 8 wherein:
said first damper further includes a spring means to maintain constantly taut said line element.

10. A system as defined in claim 9 wherein:
said frictional damping means is pivotally connected to said fixed object.

* * * * *

PO-1050
(5/69)

UNITED STATES PATENT OFFICE
CERTIFICATE OF CORRECTION

Patent No. 3,823,903                     Dated  July 16, 1974

Inventor(s) GILES A. KENDALL, JAMES C. HOPPE and WILBUR P. HSIEH

It is certified that error appears in the above-identified patent and that said Letters Patent are hereby corrected as shown below:

Under the heading Inventors appearing under the title of the patent, please change the addresses as follows:

Giles A. Kendall, Burbank, California;

James C. Hoppe, La Canada, California; and

Wilbur P. Hsieh, Des Moines, Washington

Signed and sealed this 8th day of October 1974.

(SEAL)
Attest:

McCOY M. GIBSON JR.                C. MARSHALL DANN
Attesting Officer                  Commissioner of Patents